(12) United States Patent
Morin et al.

(10) Patent No.: US 7,707,976 B2
(45) Date of Patent: May 4, 2010

(54) EFFICIENT 5-PHASE MOTOR WITH TURBO AND TWO COMPRESSIBLE CHAMBERS

(75) Inventors: Andre C Morin, Santa Barbara, CA (US); Wilson Hago, Camarillo, CA (US)

(73) Assignee: Efficient Hydrogen Motors, Santa Barbara, CA (US)

( * ) Notice: Subject to any disclaimer, the term of this patent is extended or adjusted under 35 U.S.C. 154(b) by 552 days.

(21) Appl. No.: 11/611,861

(22) Filed: Dec. 16, 2006

(65) Prior Publication Data
US 2008/0141966 A1    Jun. 19, 2008

(51) Int. Cl.
*F02B 75/22* (2006.01)

(52) U.S. Cl. .................... 123/54.5; 123/197.4

(58) Field of Classification Search .......... 123/197.1, 123/1 A, 3, 193.1, 193.3, 197.4, 289, 292, 123/58.6, 54.5, 54.2, 56.1–56.9
See application file for complete search history.

(56) References Cited

U.S. PATENT DOCUMENTS

| | | | |
|---|---|---|---|
| 5,070,835 A | 12/1991 | Sertich | |
| 5,115,768 A | 5/1992 | Peschka et al. | |
| 6,691,648 B2 * | 2/2004 | Beierle | 123/54.3 |
| 6,988,470 B2 * | 1/2006 | Brueckmueller | 123/56.3 |

* cited by examiner

Primary Examiner—Marguerite McMahon

(57) ABSTRACT

An efficient novel motor is described which works with hydrogen. The motor has 2 compressible chambers for better control of fuel and oxidant ratios. A turbogenerator is utilized to ventilate interior and exterior parts as well as generate electricity to transform waste water into fuel.

19 Claims, 18 Drawing Sheets

EFFICIENT 5-PHASE MOTOR WITH TURBO AND TWO COMPRESSIBLE CHAMBERS

1. FIELD OF INVENTION

The present invention relates to a reciprocating internal combustion engine operating on diesel, low carbon hydrocarbons, or gaseous hydrogen designed to displace piston members.

2. BACKGROUND AND PRIOR ART

There is an ever present need to improve the efficiency of motor engines. This is particularly true as hydrocarbons become a scarcer commodity. The potentially enormous monetary savings as well as abated pollution resulting from more efficient motors justify the search for greater efficiency. Most automobiles today utilize an internal combustion engine design that is highly inefficient.

The classical internal combustion engine was developed at the start of the century and continues to power an overwhelming number of existing automobiles. The classical internal engine is based on 4 strokes, as follows:

$1^{st}$ stroke: ignition followed by explosion and lowering of piston. Both valves are closed.

$2^{nd}$ stroke: the piston returns by its own inertia and the gases are evacuated when the escape valve is opened. The intake valve is closed.

$3^{rd}$ stroke: lowering of piston and aspiration of mixture of fresh air and fuel. The intake valve is open and the escape valve is closed.

4rd stroke: intake valve and escape valve are both closed, the piston returns and compresses the mixture of fresh air and fuel.

The efficiency of the classic internal combustion engine typically does not exceed 30%. There are various well-known problems with this type of engine. One primary problem is that during the power stroke the connecting rod is unable to create useful torque at the height of the explosion. The valve arrangement during the end of gas evacuation and the beginning of gas intake poses problems in flame return. The long course traversed between the Dead Center High point and the Dead Center Low point does not permit effective use of power stroke with a fast burning fuel. The engine components close to Dead Center High experience a very hot environment, and this invariably necessitates a separate liquid cooling system.

In contrast, our engine is inherently more efficient. It uses variable compression and is capable of using a wide variety of fuels. The present engine can utilize low carbon hydrocarbons, diesel, hydrogen, or any combination of these fuels. Hydrogen is preferentially added because it burns 7 to 9 times faster than high carbon fuels and can be used to accelerate their detonation. Due to the relative instantaneity of the explosive event during ignition, there is less of the wasted translational energy that is found in traditional internal combustion engines. This allows for better cooling of internal components.

Other inventions have proposed hydrogen-powered motors. U.S. Pat. No. 6,698,183 by Thordarson proposes the use of a system primarily directed for propelling water craft using hydrogen as fuel. The proposed system is comprised of a combustion chamber in which a mixture of hydrogen and oxygen produce an ignition that is able to push out a working fluid within the combustion chamber. This pressurization of the working fluid serves to propel the motor. The present invention does not utilize a fluid within the combustion chamber.

In U.S. Pat. No. 7,059,114 by Tang et al of Ford Global Technologies, a hydrogen-fueled engine is coupled to a lean NOx trap and an EGR system so that the engine is operated with a richer-than-stoichiometric air/fuel ratio, and with the mass of EGR approximating 40-80% of the mass of air and fuel. The present invention describes an engine that does not rely on a coupled lean NOx trap/EGR system with the stated specific EGR mass flow.

In U.S. Pat. No. 4,054,027 by Manzato et al, the hydrogen motor described is comprised of chambers containing reactants used for the production of hydrogen, a chamber for mixing hydrogen with air, a means for heating and compressing the contents of the gas mixing chamber, and a means for igniting the compressed gas contents to produce a work output. This work differs fundamentally from the present invention because this patent contains a compression of a mixture, while our invention contains separate gases that are compressed prior to mixing.

U.S. Pat. No. 6,892,840 by Meany describes a hybrid electric vehicle which is comprised of an AC/DC converter, a battery, a fuel converter for converting hydrocarbon-containing fuels into hydrogen, and a drive system for using either a dc electric motor or a combustion engine. The engine of the present invention does not depend on converting a hydrocarbon-containing fuel into hydrogen.

As far as we know, there is no prior art in this area. The present patent is a significant deviation of French Patent 1,464,719, dated 1966, which describes a 5-phase engine that uses valves typically used in classical combustion engines.

The present invention does not rely on valves, but rather uses a cooling jacket which separates two chambers. The gases within these two chambers are eventually combined to yield a fast and efficient explosion. The details of the present invention will become evident from the description that follows.

3. SUMMARY OF INVENTION

The present invention describes an efficient motor particularly useful for a wide variety of vehicles, including motors that operate on hydrogen and low carbon hydrocarbons such as methane and propane, as well as hybrid-electric vehicles. This technology is expected to be useful across a wide range of civilian and military applications, including commercial vehicles and light, medium-size and heavy duty trucks.

The motor of the present can work with a wide variety of fuels, including diesel, hydrogen, natural gas and propane, but hydrogen is the preferred fuel. The present design provides a high torque density, high power density, efficient engine. The compression and expansion of our combustion engine have a closer resemblance to the adiabatic processes than those in a classical internal combustion engine. The reason for this is due to the linear trajectory of the crank pin during a full displacement of the piston. The linearity allows the force of the explosion to be more readily transferred to kinetic motion of the piston. There is little resistance found during piston descent. By contrast, in a typical internal combustion engine, the crank pin follows a circular trajectory at all times. There is acceleration of the crank pin at all times.

We will now describe the workings of our engine by use of the following figures:

DETAILED DESCRIPTION

Figure 1:
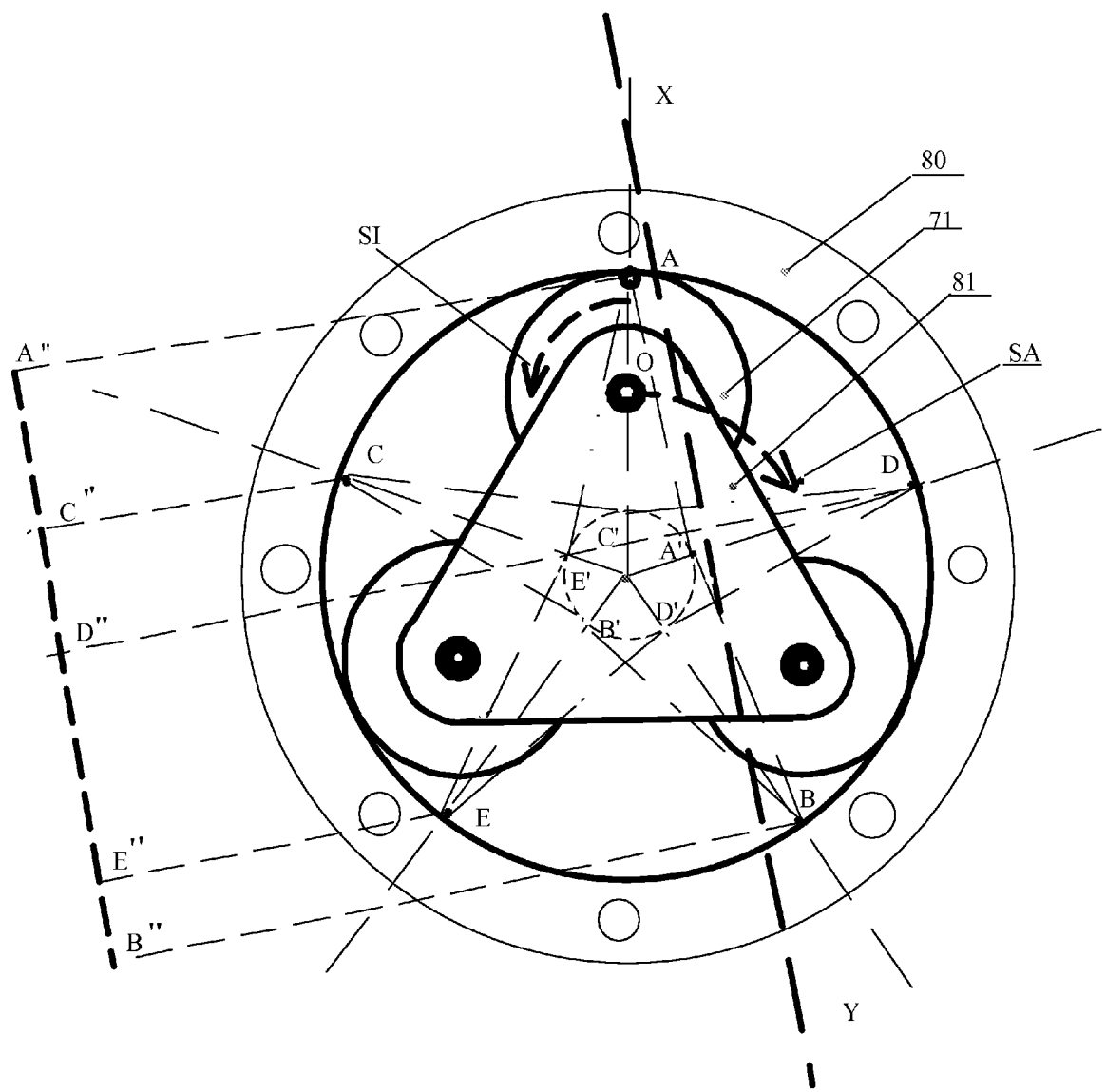
FIG. 1. The basic crankshaft arrangement.
Figure 2:
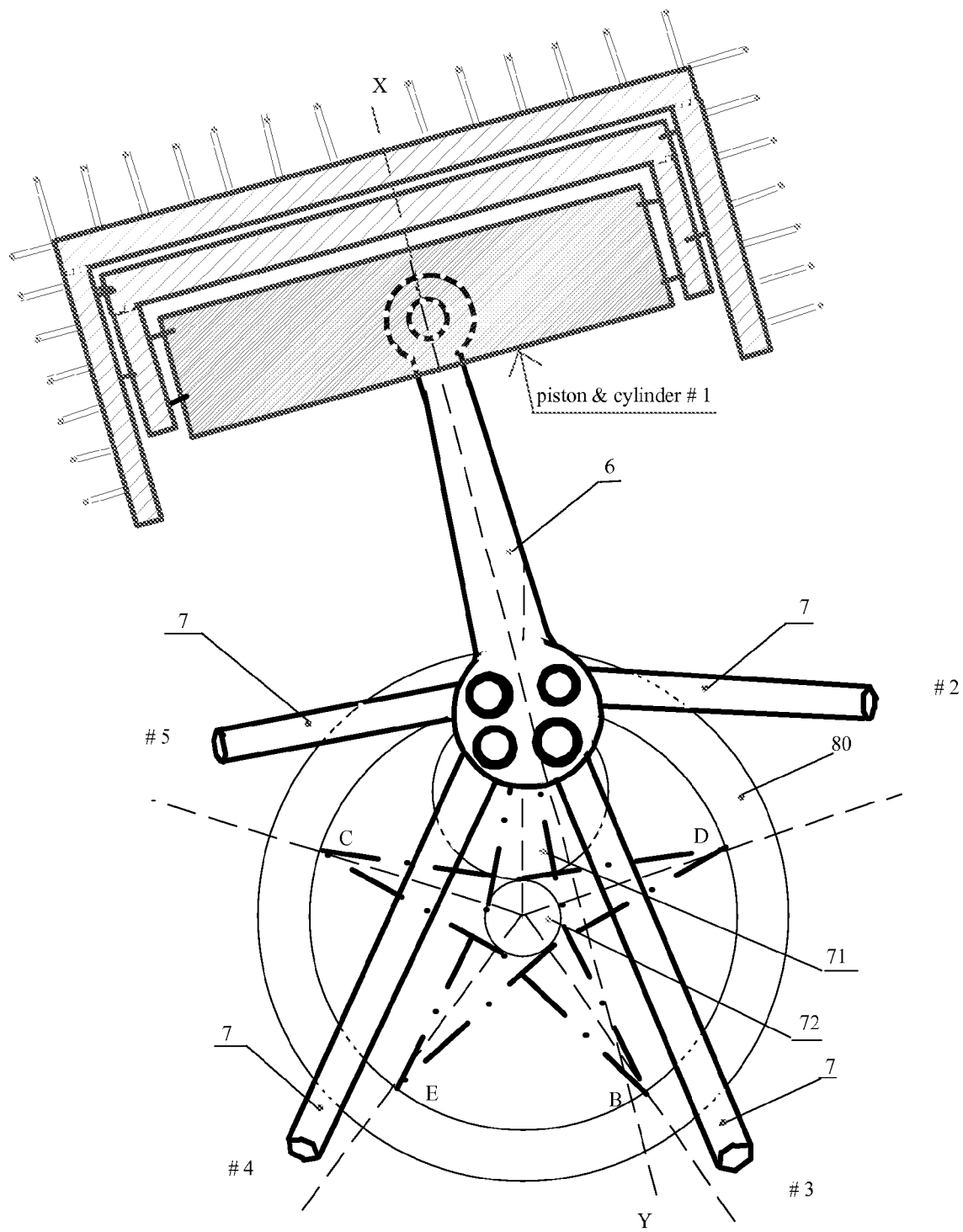
FIG. 2. Basic connection of piston to satellite.

The present invention describes a novel 5-phase engine that exhibits the following 3 facets:

$1^{st}$ facet: Explosion, comprises $1^{st}$ phase $2^{nd}$ facet: Cooling and Intake, comprises $2^{nd}$, $3^{rd}$ and $4^{th}$ phases $3^{rd}$ facet: Compression, comprises $5^{th}$ phase These 3 facets, and their consequent 5 phases, are realized in the movement of satellite gears 71 as they rotate around a fixed crown 80, as demonstrated by FIG. 1. It is shown that the satellite gears are attached to a crankshaft assembly 81 at point O. As illustrated in FIG. 2, a piston is attached to a satellite gear by a single connecting rod assembly 6. The novelty of the present invention lies in the utilization of a cylinder and piston assembly that effectively realizes the 5 phases.

We will first provide an overview of satellite and piston movements during the 5 phases. As the satellite rotates, its gears move along the periphery of the fixed crown. Point A, as shown in FIG. 1, is the axis of the crank pin that attaches the satellite to connecting rod assembly. This axis follows a quasi-linear trajectory ABCDEA during the 5 phases as follows:

$1^{st}$ phase, explosion. Point A demarcates the highest point of piston in cylinder. As the satellite rotates counterclockwise, the crank pin axis follows a trajectory A-A'-B. Point B is the lowest point of piston in cylinder. This first phase describes the power stroke. The crankshaft assembly rotates clockwise.

$2^{nd}$ phase. The satellite continues its rotation and the crank pin axis follows a trajectory B-B'-C. As point C does not demarcate the highest point of the piston in the cylinder, a constant engine rotation necessitates that piston ascend slowly during this phase. Cylinder cooling is effected by forcing fresh air through suitable cylinder openings.

$3^{rd}$ phase. The crank pin axis follows a trajectory C-C'-D. Points C and D are close to each other. The piston must descend slowly as it the axis moves from C to D. It is practically immobile during this phase.

$4^{th}$ phase. A trajectory D-D'-E is followed by axis. Point E is slightly higher than point B, the lowest point and the piston moves at a faster speed than before.

$5^{th}$ phase, compression. A trajectory E-E'-A is followed by the crank pin axis. As E is close to the bottom, a rapid piston ascent is indicated in order to return to the highest point A.

Figure 3:
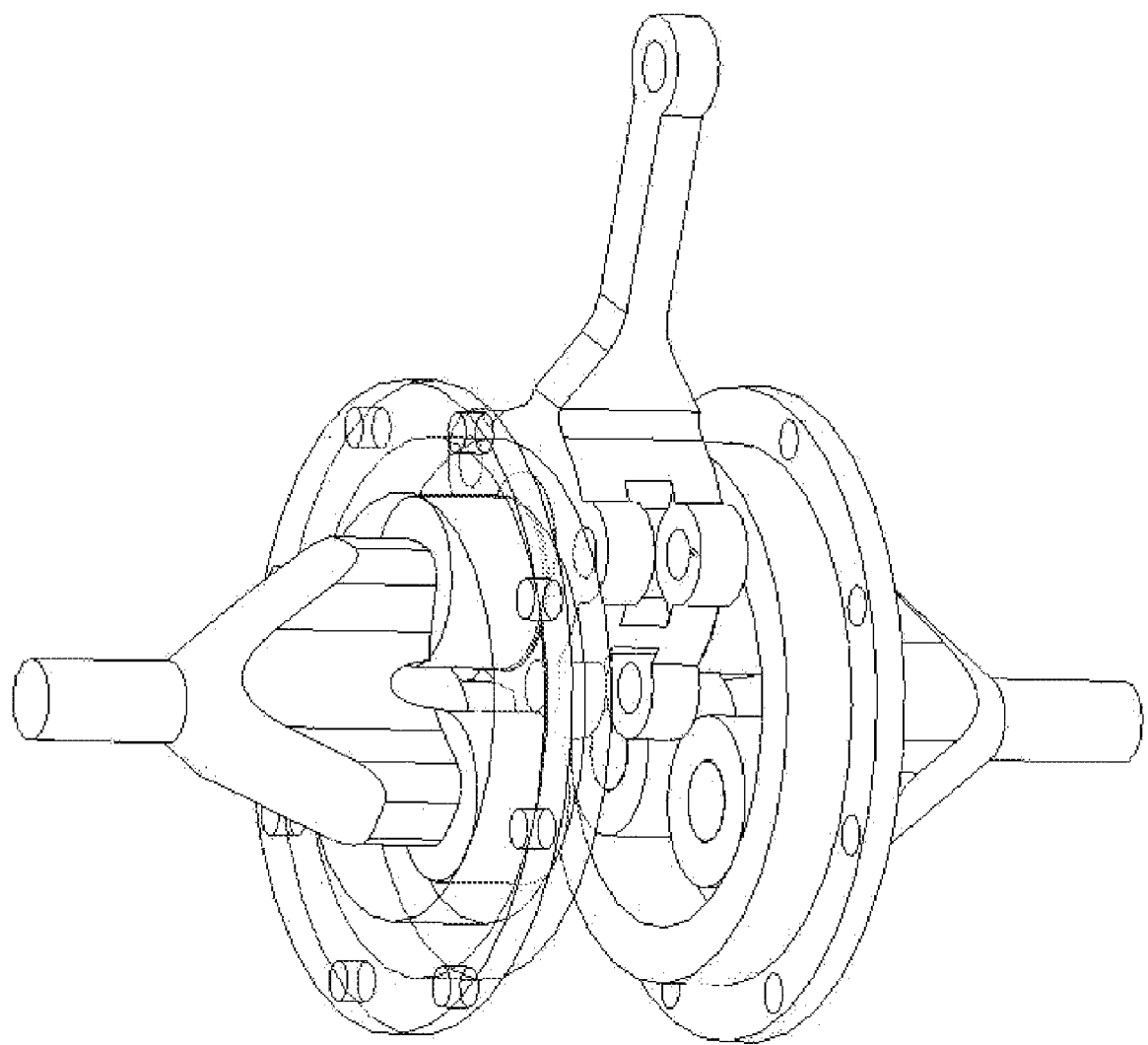
FIG. 3. Three-dimensional rendition of some components of basic connection of piston to satellite.

It is evident that the linear trajectories developed in the course of these phases resemble that of a 5-pointed star. It is advantageous to thus locate a cylinder at each point of the 5-pointed star. A basic outline of an engine containing 5 cylinders is shown in FIG. 2. Cylinder axes for the 5 cylinders meet at the center of crank pin 90. Each cylinder axis passes through a point of the 5-pointed star. FIG. 2 shows a possible connection of a piston to the satellite, in which one piston (denoted #1) is attached to a main connecting rod 6 and the other four pistons are attached to 4 auxiliary connecting rods 7. The latter are attached to the main connecting rod via journals. A three-dimensional rendition of some components of this configuration is shown in FIG. 3.

Figure 4:
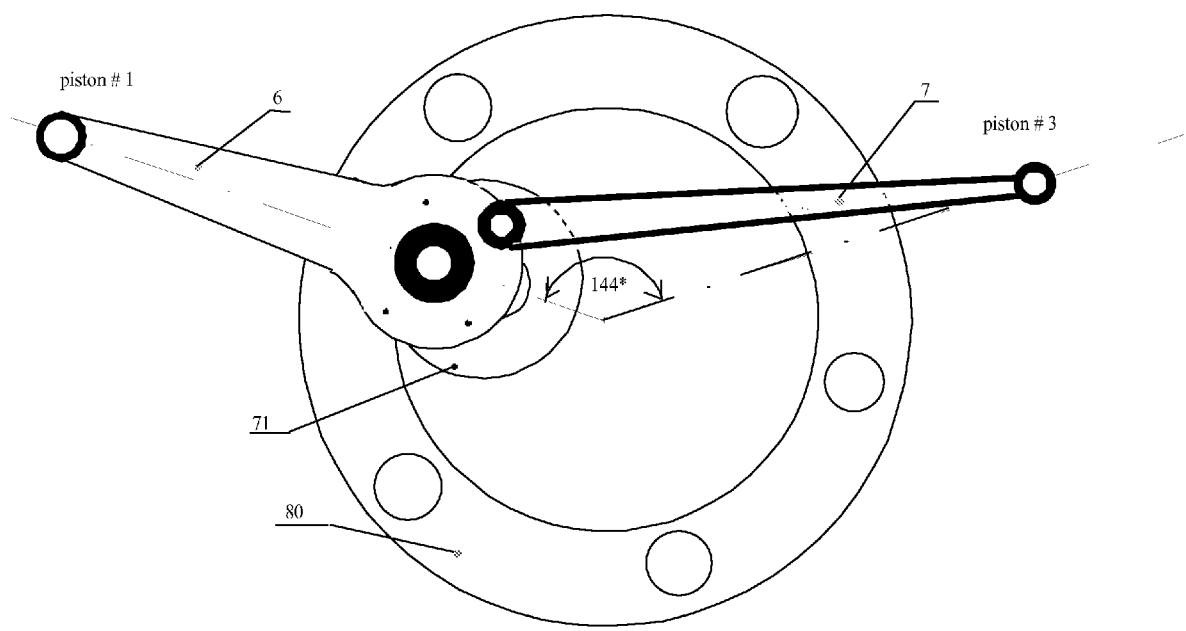
FIG. 4. An alternative configuration of the present engine with opposing piston separated by 144°.
Figure 5:
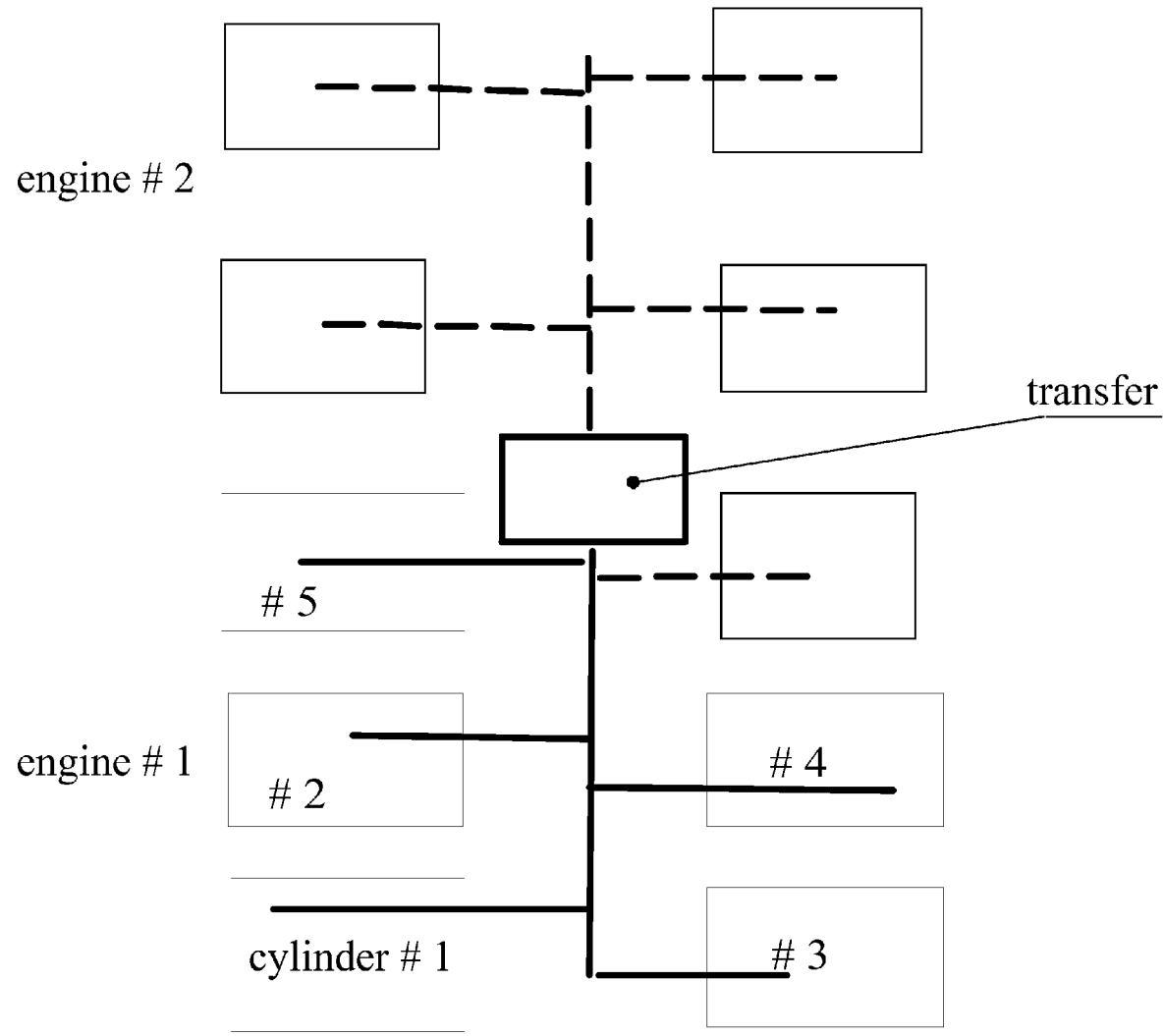
FIG. 5. Arrangement of two engines of the present invention having a configuration with 144° piston separation.

Besides the configuration described above, other configurations are possible for the engine of the present invention, including arrangements in-line, V-type arrangement or any other arrangement commonly found in present automobile engines. Another possible configuration is shown in FIG. 4. In this configuration 2 cylinders are separated from each other by 144 degrees, instead of 72 degrees as would be found in a 5-pointed star engine. As shown in FIG. 5, this arrangement requires two in-line motors acting in concert, each one possessing 5 cylinders that are balanced by the other. The balancing may be achieved by a suitable transfer box.

Figure 6:
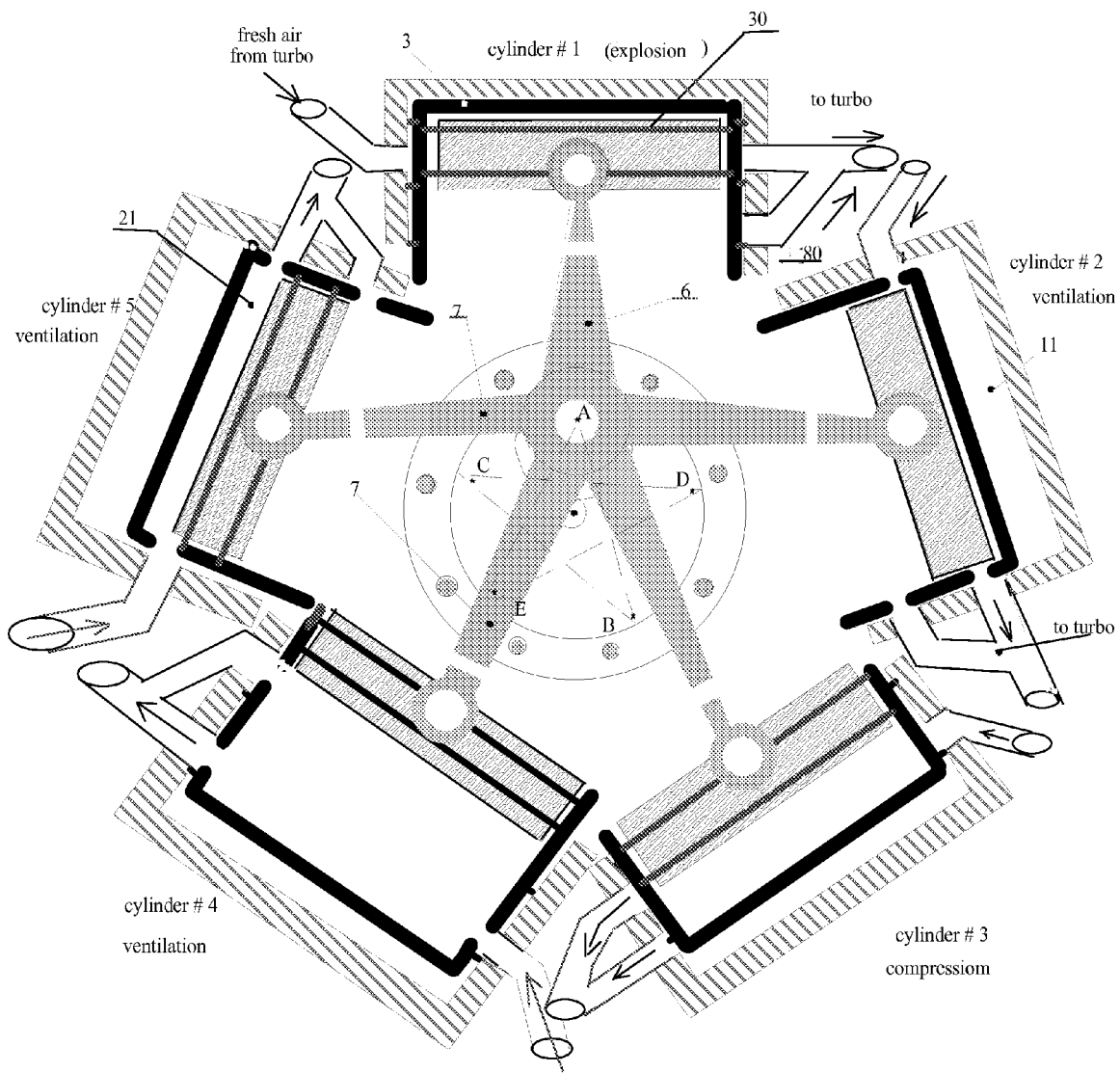
FIG. 6. A 5-cylinder rendition of the present invention.
Figure 7:
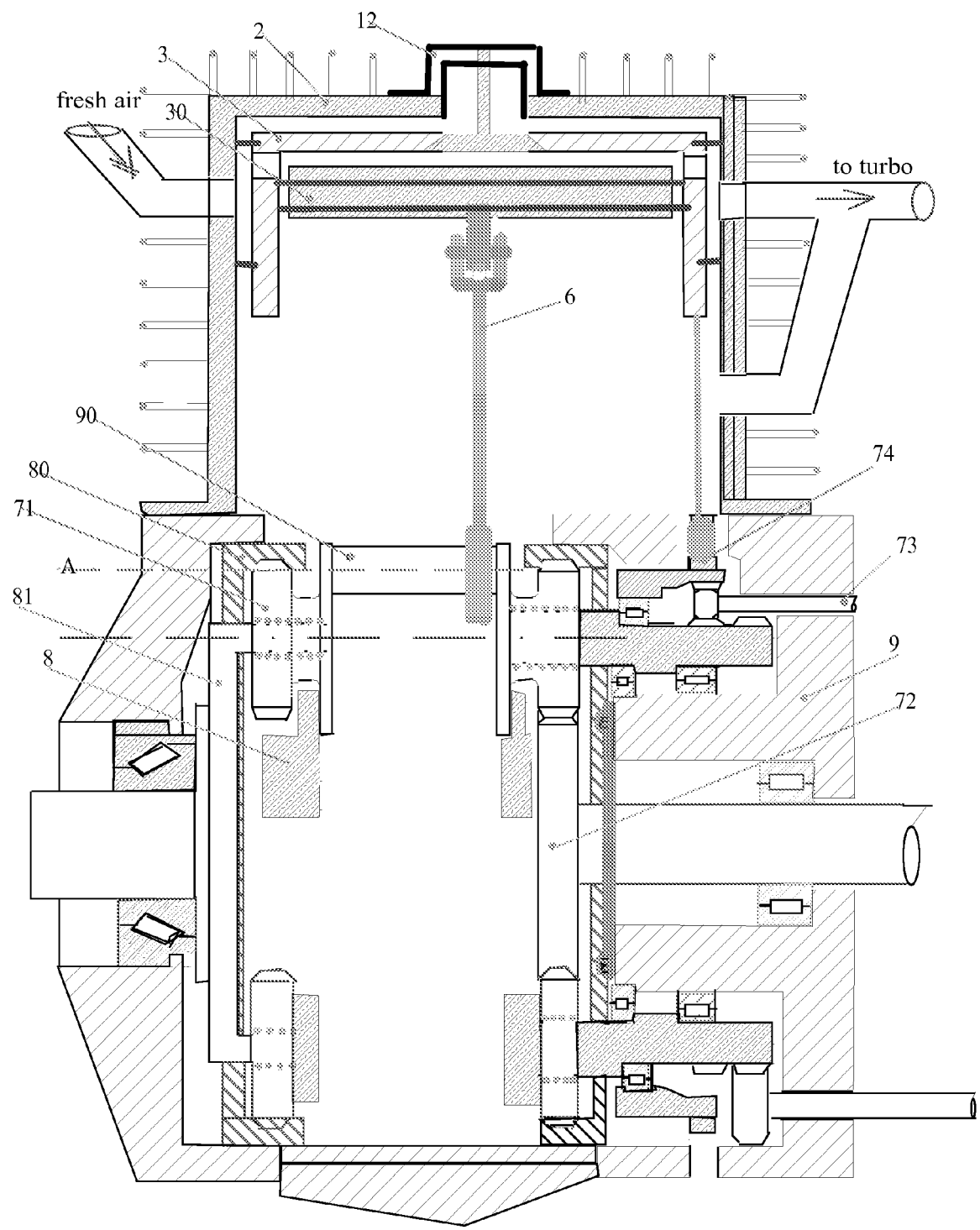
FIG. 7. A side view of 5-cylinder rendition of present invention.
Figure 8:
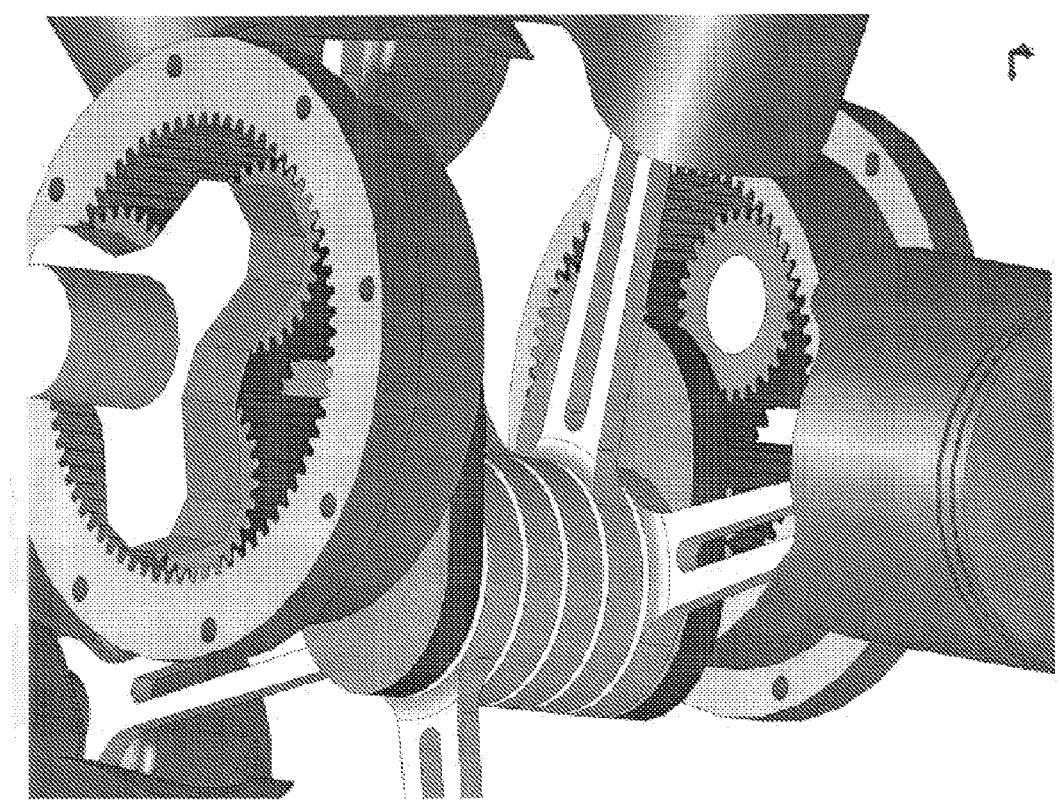
FIG. 8. Three-dimensional possible rendering of concentric crank pins in the present engine.
Figure 9:
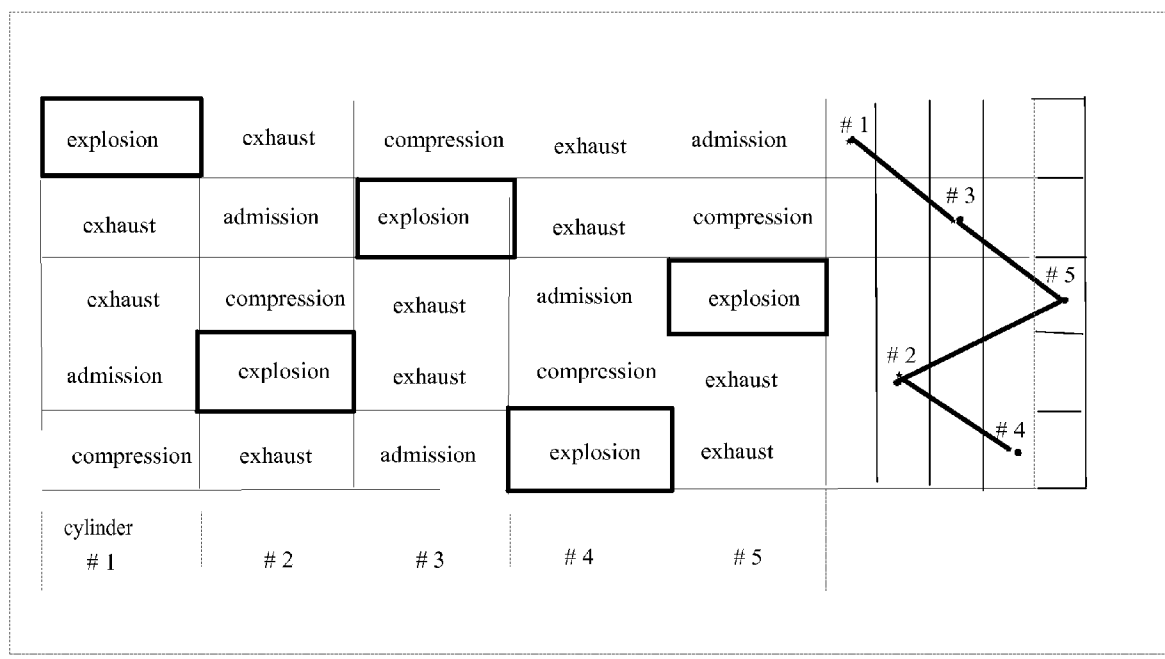
FIG. 9. Overview of firing order of present engine.

The simplest configuration is for a piston that is undergoing a power stroke to have an opposing cylinder that is undergoing compression, and that is achieved by a 5-pointed star engine. A possible rendering of this engine is shown in FIGS. 6 and 7. A partial 3-dimensional rendering of the engine, using similar connecting rods possessing concentric crank pins, is shown in FIG. 8. The corresponding firing order of this motor is shown in FIG. 9.

Figure 10:
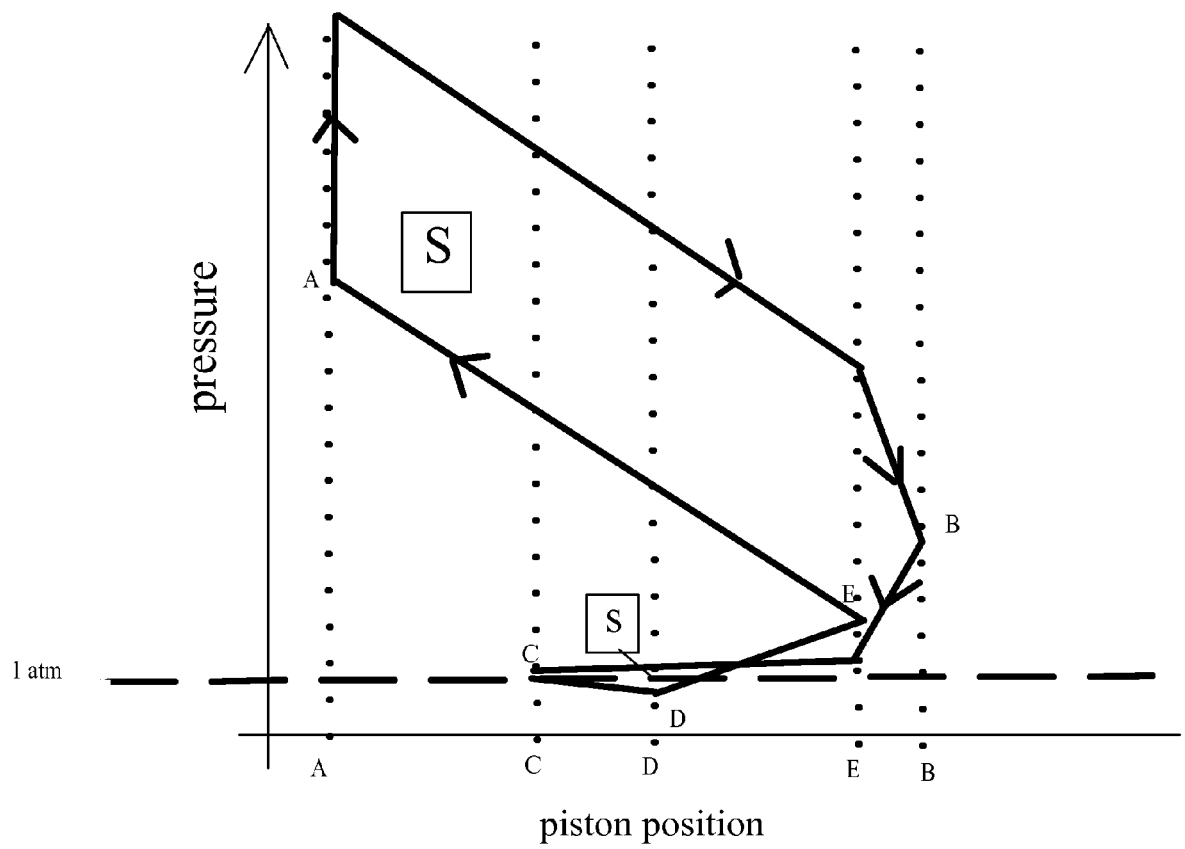
FIG. 10. Description of piston pressure and displacement during the 5 phases.

This engine has several advantages over the classical 4-stroke engine. During the power or compression strokes, there is significant diminution in piston resistance. This is a consequence of two factors. One factor involves the linear or quasi-linear trajectory followed by the crank pin axis during a given phase. In a classical 4-stroke engine this trajectory is circular at all times, and thus a piston experiences an additional resultant drag at all times. This is illustrated in FIG. 10, which outlines the pressure generated within a cylinder as a function of piston travel. The area demarcated as 'S' denotes the useful work performed during this travel, while the area denoted as 's' denotes the resistance encountered by the piston. For a typical combustion engine the area 's' is a significant fraction of the area 'S'. For the engine of the present invention the ratio S/s is designed to be significantly larger. Additionally, piston travel distance is decreased in the present invention.

The other factor involves the rapid evacuation of exhaust gases. In a classical 4-stroke engine, during the $2^{nd}$ stroke, exhaust gas is evacuated by a valve while the piston is ascending. The piston experiences drag because the exhaust gas evacuation is not instantaneous. In the present invention exhaust gas is evacuated when the piston reaches Dead Center Bottom.

Figure 11:
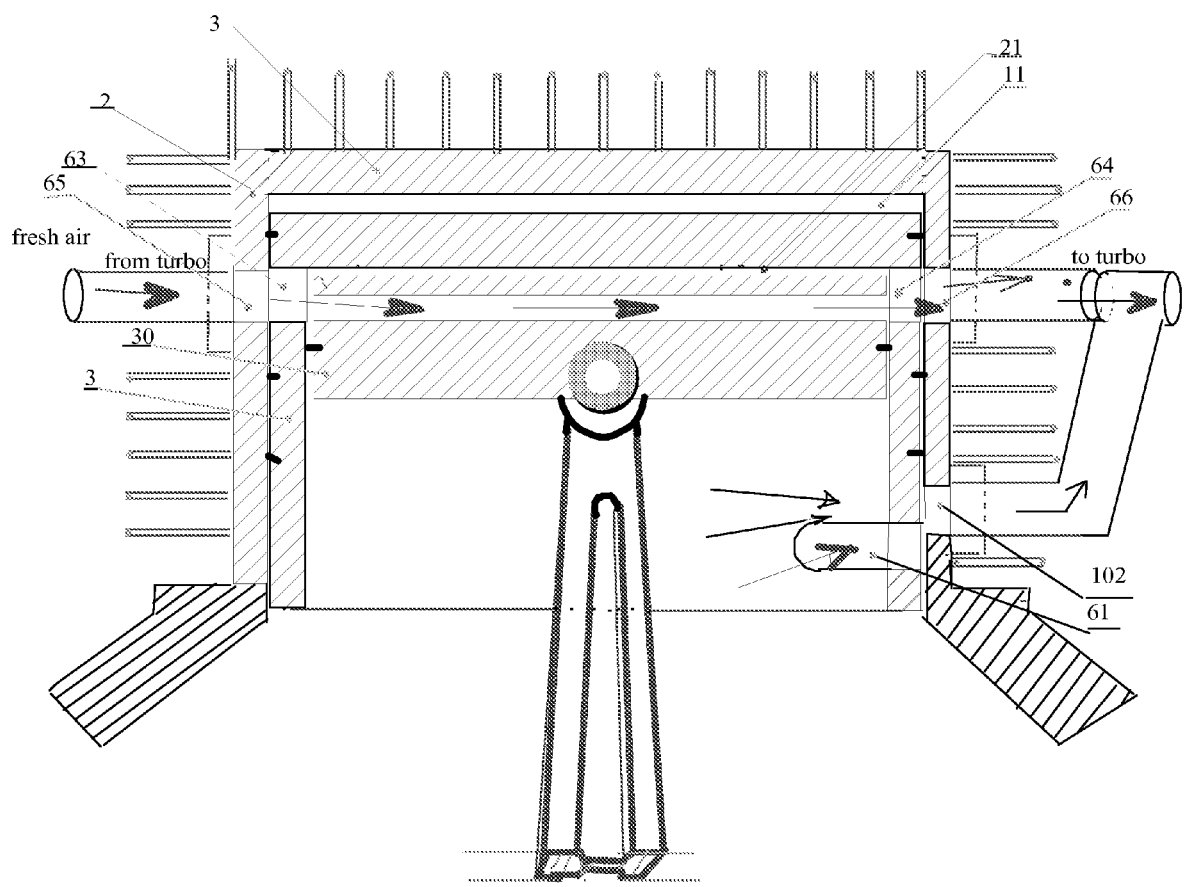
FIG. 11. Possible elaboration of piston cooling.

The present invention additionally uses a turbo-generator to ventilate fresh air into hot components. This is illustrated in FIG. 11, which shows two cooling possibilities. In one, external fresh air ventilates a hot piston, said fresh air is pushed through by the turbo. In the second, the turbo aspirates hot exhaust gas out of cylinder right after the power stroke. The rotational energy of the turbo-generator is also used profitably to convert waste heat back into fuel.

MODE OF OPERATION

Referring specifically to the configuration in FIG. 6, the engine consists of five cylinders whose cylinder axes intersect respectively each point of a 5-pointed star. Each cylinder 2 comprises a cavity 11 wherein resides a sliding cooling jacket 3 within said cavity, said cooling jacket containing within its internal volume 21 a piston 30 that slides within said cooling jacket. This basic setup allows the introduction and compression of two separate gases (either fuel or oxidant) within compartments 11 and 21 at appropriate intervals within each phase of each cylinder. A consequent mixing and detonation of these two compressed gases within cavity 21 yields a power stroke. We will now discuss the 5 phases from an operational point of view.

Figure 12:
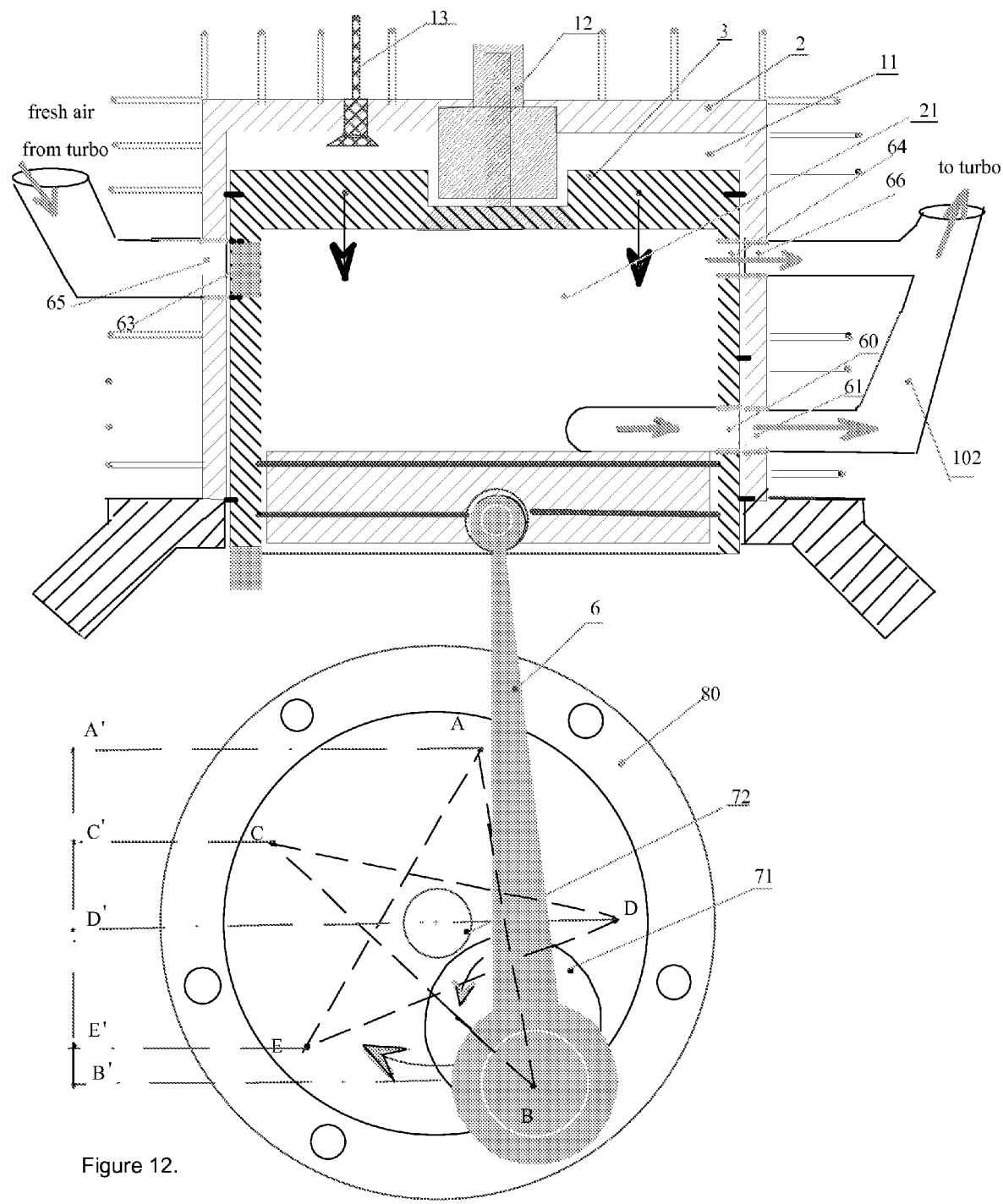
FIG. 12. Diagram of some engine components at end of $1^{st}$ phase.

FIG. 12 demonstrates the end of the first phase. The piston, along with the cooling jacket, both start at their highest points, demarcated by crank pin axis location point A. When the explosive event occurs, the piston is forced to descend and the axis of the crank pin moves to point B, following the linear trajectory specified by line XY as shown in FIG. 1. The cooling jacket rests at the high point for most of this phase. As the piston descends it exposes orifices 60 and 61 of the cooling jacket and the cylinder, respectively, which become collinear. These orifices provide the escape outlet for the hot gases from explosive event at the top of the first phase. Orifice 63 is closed due to a rotation of the cooling jacket. The turbo 102 provides for rapid and immediate evacuation of these hot gases. At point B, the lowest point in the phase, the piston is completely below both these orifices and the hot gases have escaped from the internal cavity 21.

Figure 13:
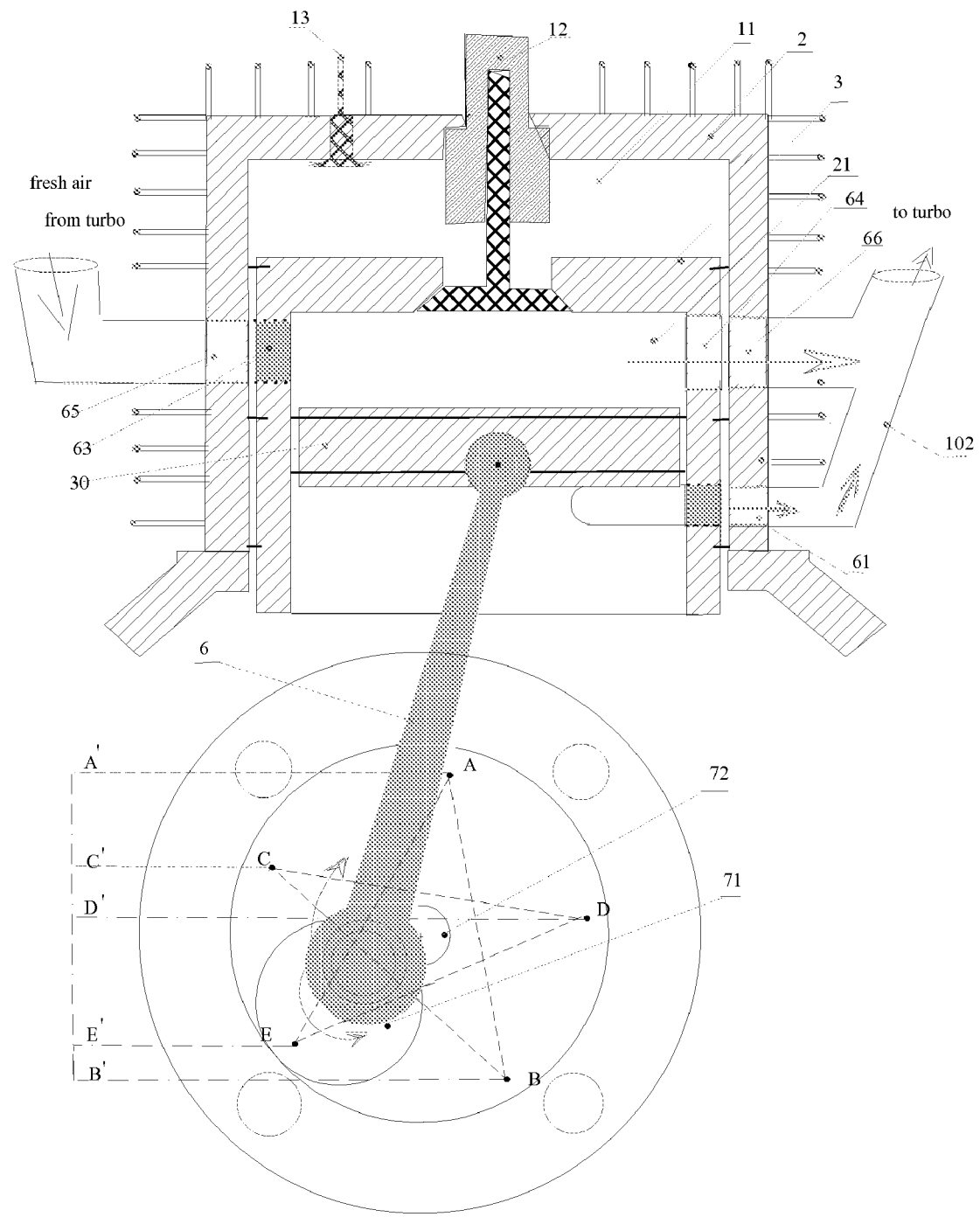
FIG. 13. Diagram of some engine components during middle of $2^{nd}$ phase.

FIG. 13 shows the middle of the second phase in which the evacuation of hot gases continues. In second phase, as the crank pin axis moves from point B to point C, the following processes occur. First, the cooling jacket descends and the piston ascends. The slow descent of the cooling jacket has the effect of creating a vacuum in cavity 11. The slight rotation of the cooling jacket plugs orifices 60 and 61. Second, the cooling jacket moves down to a point where orifices 63 and 65 are collinear, and, concurrently, orifices 64 and 66 are also collinear, though the latter two orifices need not be collinear with the former two orifices. Orifices 64 and 66 are also connected to a turbo 102 during this phase. On the outlet side, the rotational energy of the turbo may be used, via an alternator or generator, to create electricity that powers hydrogen gas production via water electrolysis. This hydrogen may then be used as additional fuel for the engine, rendering the engine more efficient. Towards the end of this phase, as the crank pin axis reaches point C, the piston comes into close vicinity of the cooling jacket.

The cooling jacket movement may be controlled by a variety of suitable mechanisms, such as cam lobe or pneumatically controlled pistons. FIG. 7 provides an illustration of such control, in which cam lobes 74 are controlled by the rotation of central pinion 72. It should be noted that the cooling jacket at appropriate intervals is slightly rotated to allow the exposure and masking of orifices within the cooling jacket. Suitable counterweight mountings 8 dampen vibrations. A specific cylinder 2 may be surrounded by a cooling assembly which can be in the form of grills which are suitably air cooled or can be a liquid-containing jacket that surrounds said cylinder.

Figure 14:
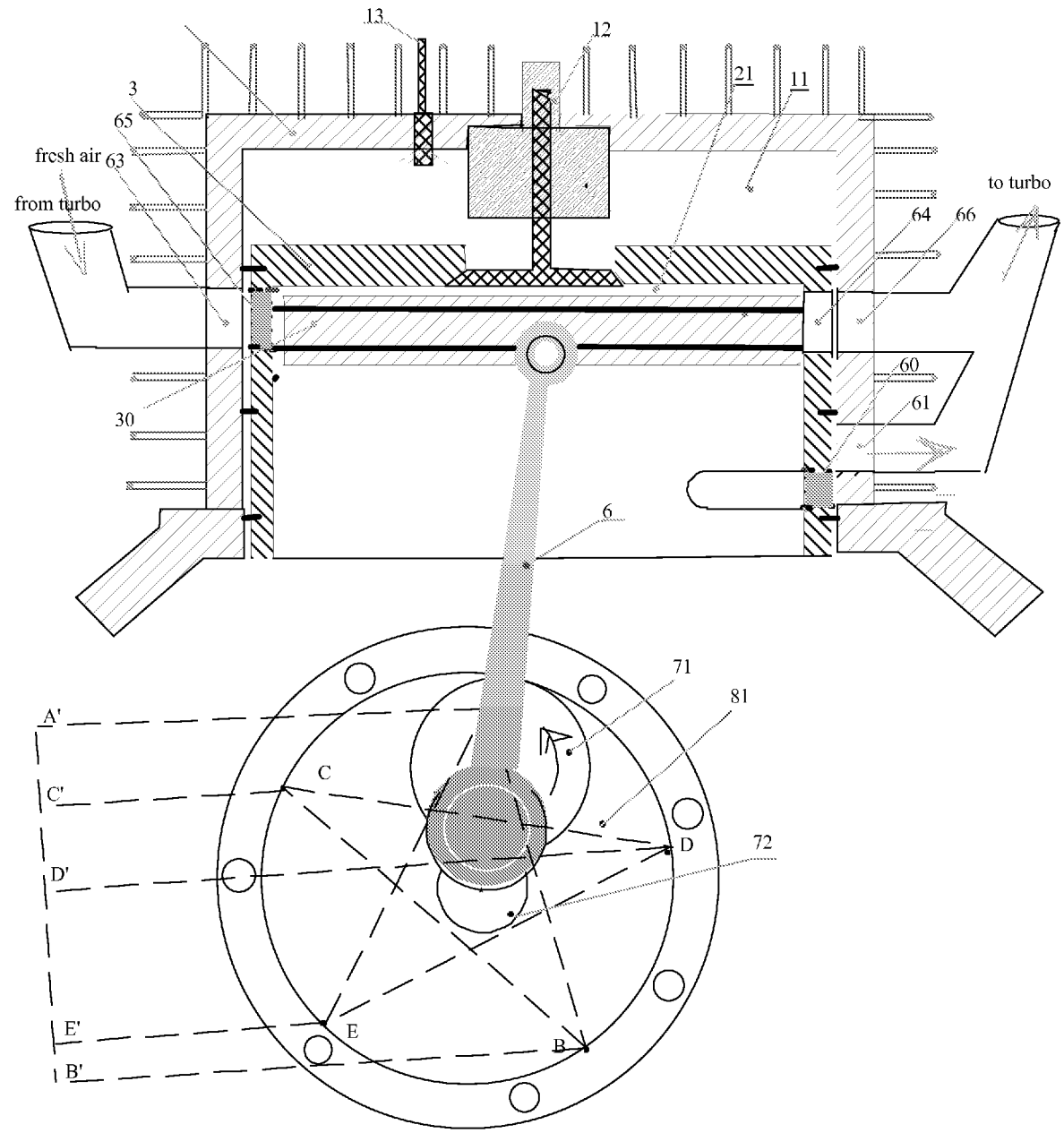
FIG. 14. Diagram of some engine components during middle of $3^{rd}$ phase.

In the third phase, illustrated in FIG. 14, the crank pin axis moves from C to D. An optional electromechanical gate 103 on the turbo may also be closed to prevent aspiration of air from the inner cavities. The slight ascent of the cooling jacket is accompanied by a very slow descent of the piston as demarcated by the movement of the crank pin axis from point C to D. Cavity 11 is under vacuum during this time. Thus two separated evacuated volumes are present and these are ready to be filled with respective gases. The injection of the fuel or oxidant may be accomplished during this phase in the next via injection system 13.

Figure 15:
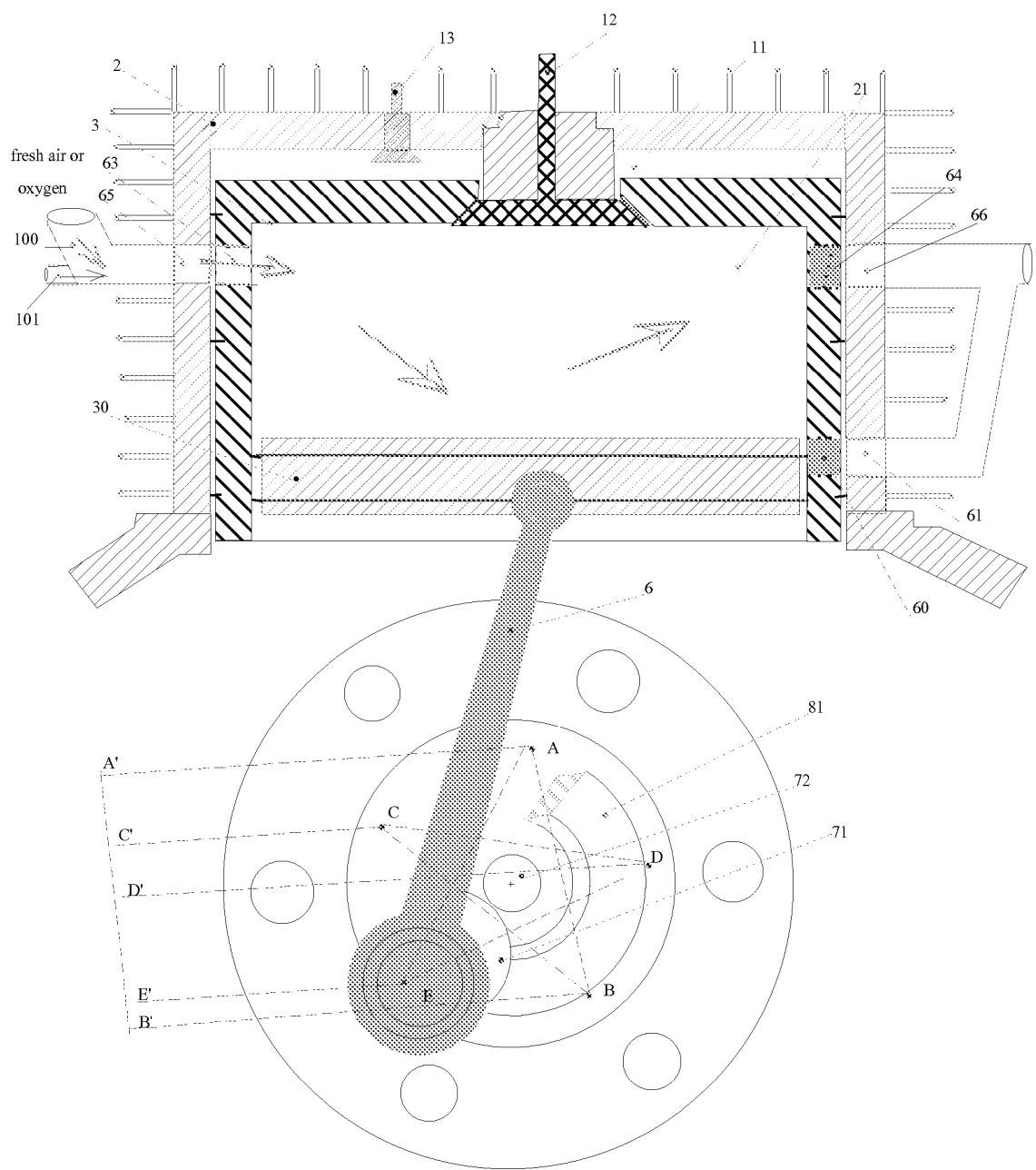
FIG. 15. Diagram of some engine components at end of $4^{th}$ phase.

In the fourth phase, shown by FIG. 15, the crank pin axis is lowered from point D to point E, at which point the piston has been lowered sufficiently to completely plug orifices 60 and 61. Orifice 63 and 65 are open to receive fresh air or injected oxygen. An optional electromechanical gate 101 on air supply 100 can control air intake. Maximal volume is made available for gas introduction in cavity 21. Fuel or oxidant may be injected at this point in cavity 11 if it was not injected in the previous phase. Meanwhile the cooling jacket rests immobile but rotates in order to block orifice 64 and seal half the jacket from further aspiration.

Figure 16:
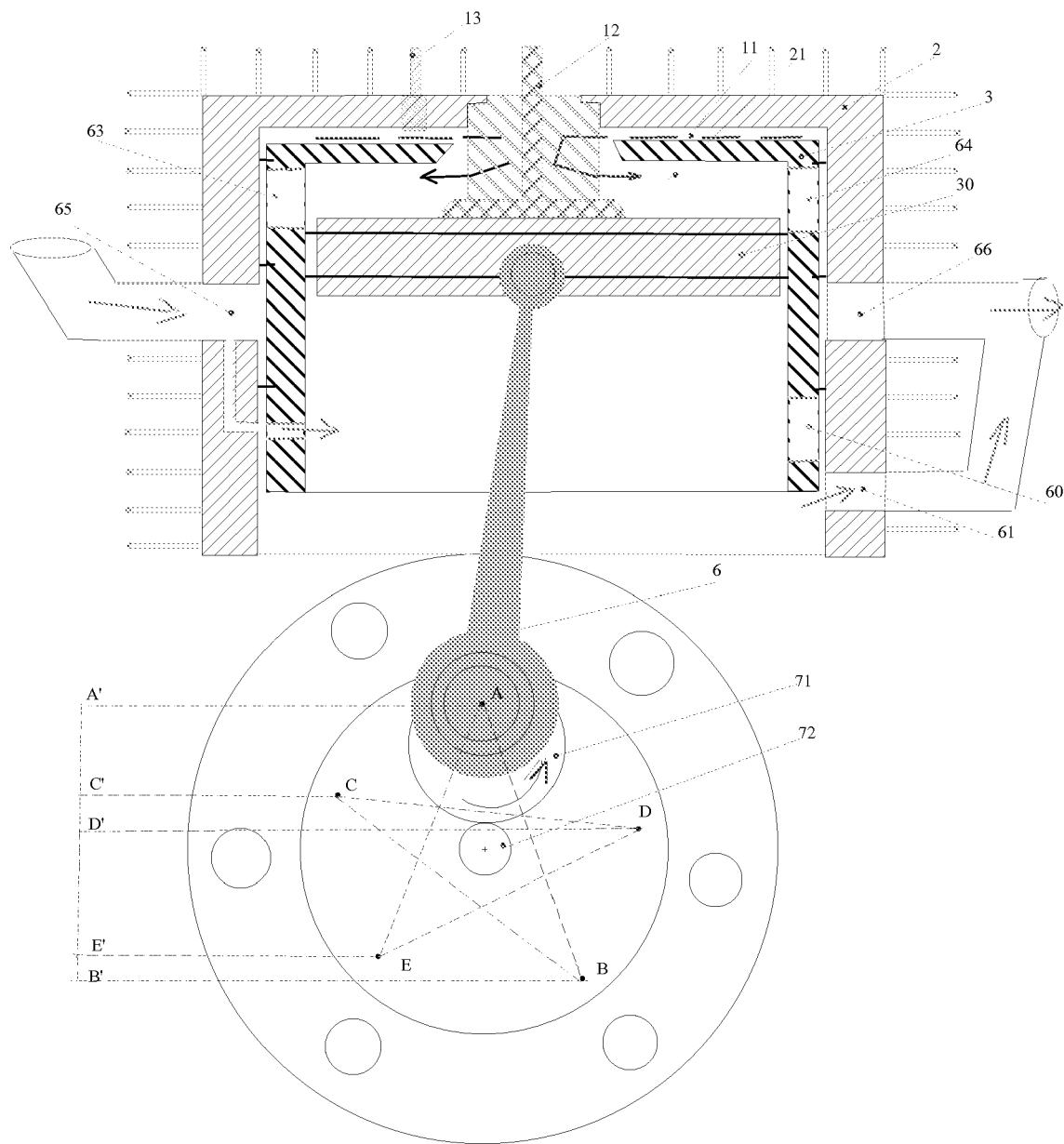
FIG. 16. Diagram of some engine components at end of $5^{th}$ phase.
Figure 17:
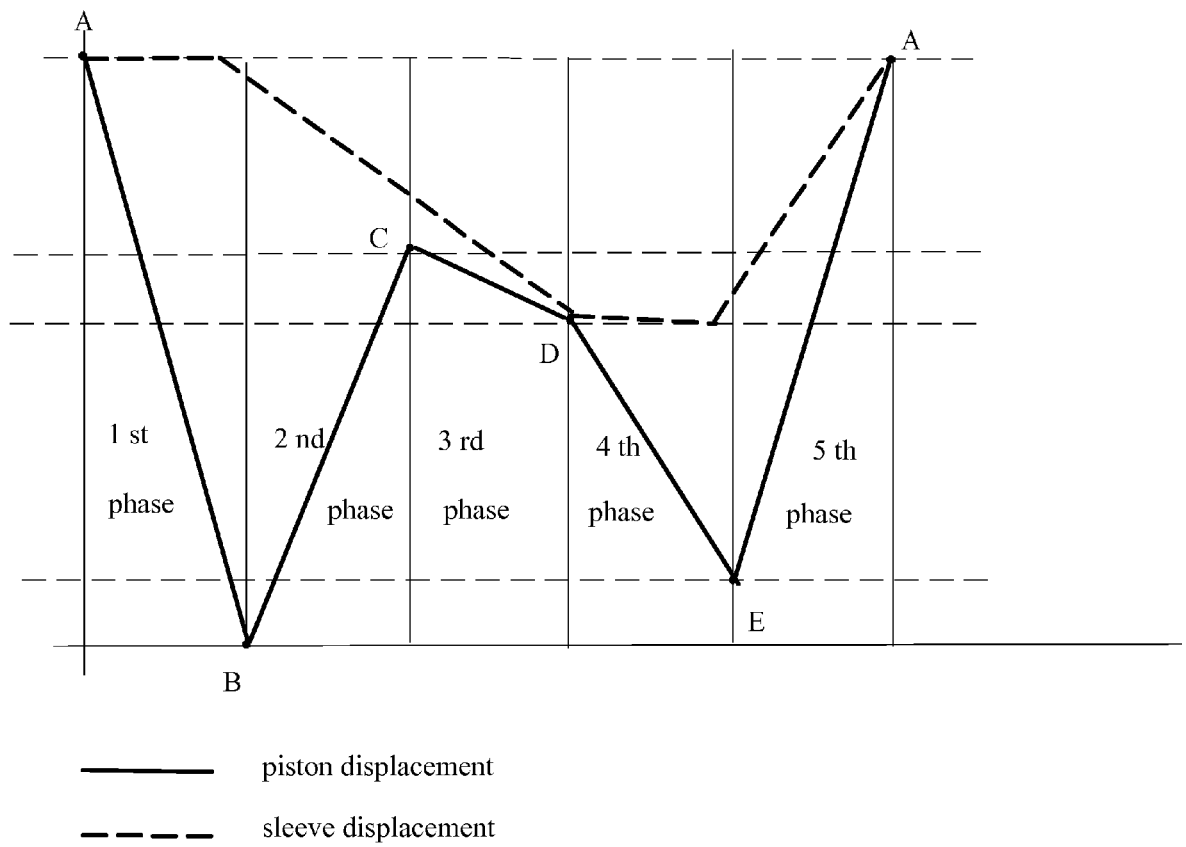
FIG. 17. Description of piston and sleeve displacement during 5 phases.

During the fifth and final phase, shown by FIG. 16, the crank pin axis returns from point E to starting point A. This is the compression stroke. Close to point E fuel is injected into cavity 11. After this injection the piston ascends linearly or quasi-linearly but rapidly to compress the fuel. The compression is adiabatic until the piston reaches its highest point. The cooling jacket ascends completely until it contacts the cylinder. The compressed fuel in cavity 11 is forced to go through gate 12. Both the piston and the cooling jacket return to their highest points in the cylinder. The two separate compressed gases are allowed to mix with the opening of gate 12. This gate may be a combination of strictly mechanical, electromechanical, or pneumatic in nature. An ignition mechanism such as a spark plug in cavity 11 may be used to promote the explosion of the mixed gases to cause the power stroke. The piston and cooling jacket displacements at each phase are demonstrated in FIG. 17.

The present engine exerts variable pressure through the introduction of various amounts of fuel and air introduced into the cylinders. Diesel mixed with hydrogen has a wider range of combustion than diesel fuel by itself. There is a wide range of concentration (from 20% to 100%) which hydrogen mixed with oxygen can form an explosive mixture. Pressure inside a typical combustion engine is controlled by varying the piston travel, but in our case this may be achieved more conveniently by injecting different amounts of fuel and controlling the amount of air/oxygen allowed into the chamber. Additionally, combustion near stoichiometric air/fuel ratio may be maintained due to injection control of both fuel and air. Air inflow may also be controlled via electronic control of gates 101. Fuel inflow is controlled via the injection system 13 for fuel. Both these control systems may be accessed readily via microprocessors.

Figure 18:
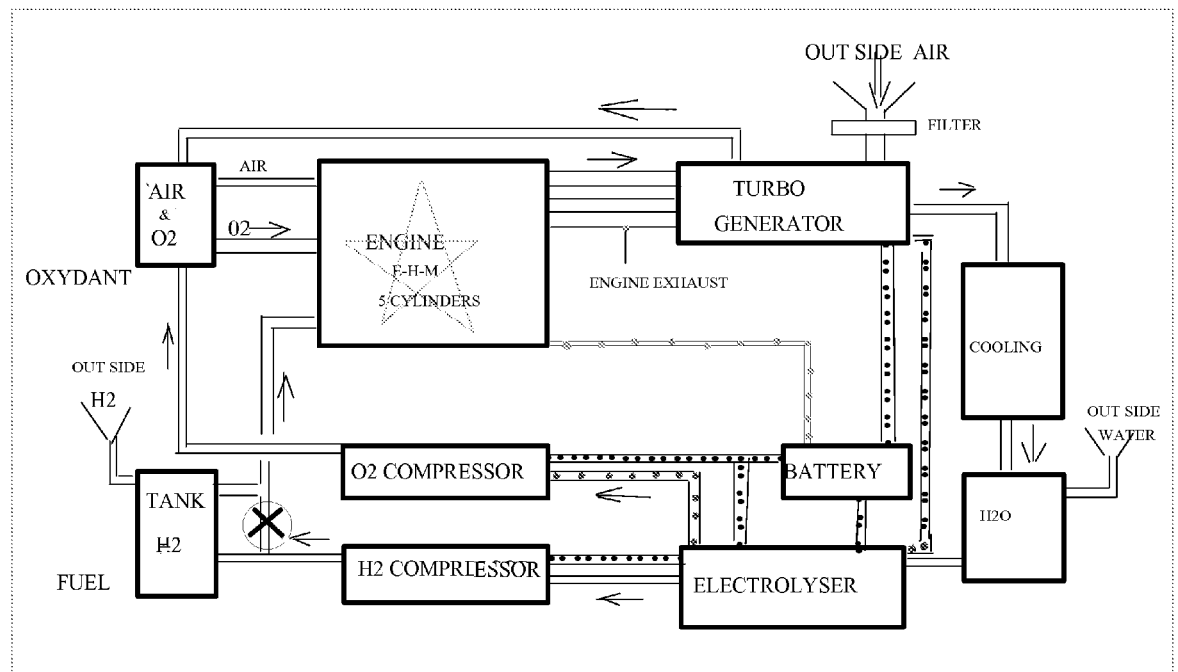
FIG. 18. Possible connection of engine to a system.

A possible connection of the engine of the present invention to a system designed for a hybrid electric vehicle is shown in FIG. 18. Burned fuel turns a motor which is coupled to a turbo-generator that efficiently cools various hot components. The rotation of the turbo is used to generate electrical energy. This electrical energy can be used to directly power an electrolyser which serves to break water into hydrogen and oxygen. The latter two can be fed back into the engine as fuel and oxidant, respectively. A battery acts as an electrical reserve that can store the electrical energy generated by the turbo. The battery may also power the electrolyser and power the compressors that compress the output from the electrolyser. This design is efficient because it converts part of what would normally be waste heat back into fuel. The turbo-generator is expected to turn at typical turbo speeds of 20,000 to 100,000 rpm. This in turn will ensure that rapid cooling occurs throughout all relevant engine components.

The invention claimed is:

1. A motor engine for converting hydrogen, diesel, or a low carbon containing hydrocarbon into mechanical energy, comprising:
   Five cylinders or a multiple of 5 cylinders;
   Wherein each cylinder contains two compressible chambers
   Wherein first chamber, called the fuel chamber, comprises a cavity made between the inner surface of a cylinder and outer surface of a sliding member moving within said cylinder,
   Wherein second chamber, called the oxidant chamber, comprises a cavity made between the inner surface of sliding member moving within said cylinder and the outer surface of a piston moving within said sliding member, a fuel source for introducing hydrogen, diesel, or a low carbon hydrocarbon into the fuel chamber; an oxygen source for introducing an oxygen-containing gas mixture into the oxidant chamber; a means for mixing fuel and oxygen from said fuel chamber and oxidant chambers; a means for igniting this mixture within the oxidant chamber;
   whereby said reciprocating pistons are jointly attached to a rotating member whose axis of rotation follows a noncircular trajectory during one revolution.

2. A motor according to claim 1 in which rotating member is a satellite gear or crank pin.

3. A motor according to claim 1 in which the axis of rotating member follows a linear trajectory as a piston descends during the explosive phase or ascends during a compression phase.

4. A motor according to claim 1 in which the axis of rotating member follows a quasi-linear or noncircular trajectory as a piston descends during the explosive phase or ascends during a compression phase.

5. A motor according to claim 1 in which the cylinders are separated from each other by $360*n/5$ degrees, where n can vary from 1 to 4.

6. A motor according to claim 1 in which the 5 reciprocating pistons or a multiple of 5 reciprocating pistons are attached jointly to a common member via, respectively, 5 connecting rods or a similar multiple of connecting rods.

7. A motor according to claim 1 in which the 5 reciprocating pistons or a multiple of 5 reciprocating pistons are each attached separately to a common element via a connecting rod.

8. A motor according to claim 1 in which the means for mixing fuel and oxidant are selected from a mechanical gate, an electromechanical gate, a pneumatic gate, or similar valve.

9. A motor according to claim 1 in which the oxygen source is fresh air or injected oxygen.

10. A motor according to claim 1 in which the fuel source is hydrogen, methane, propane, diesel, or any combination of these.

11. A system including the following:
    A motor according to claim 1;
    A turbo-generator that receives exhaust gases from said motor and produces electricity by converting mechanical rotational energy.

12. A system according to claim 11 in which the turbo-generator is used to ventilate the motor interior components, motor exterior components, or both.

13. A system according to claim 11 in which the electricity generated by the turbo-generator is used to power an electrochemical system, selected from fuel cells and storage batteries.

14. A system according to claim 11 in which the electricity generated by the turbo-generator is used to power an electrolyser.

15. A system according to claim 1 in which the sources are selected from liquid-containing tanks, gas-containing tanks or compressors.

16. A system according to claim 14 in which the sources derive their input from an electrolyser.

17. A system according to claim 11 in which electromechanical system is used to power compressors.

18. A system according to claim 11 in which the electrolyser is used to power compressors.

19. A system according to claim 13 in which the electrochemical system is used to power an electrolyser.

* * * * *